April 19, 1960  W. C. BROWN  2,933,723
LOW LEVEL DUPLEXER SYSTEM
Filed Jan. 2, 1958

INVENTOR
WILLIAM C. BROWN
BY Elmer J. Gorn
ATTORNEY

United States Patent Office 2,933,723
Patented Apr. 19, 1960

2,933,723

LOW LEVEL DUPLEXER SYSTEM

William C. Brown, Weston, Mass., assignor to Raytheon Company, a corporation of Delaware Application January 2, 1958, Serial No. 706,812

8 Claims. (Cl. 343—5)

This invention relates to a low-level duplexing arrangement using a reciprocal high frequency amplifier characterized by substantial amplification capability in one direction only, wherein the duplexer may be positioned on the input side of the amplifier at a region of comparatively low energy level.

Conventional radar systems are well known which incorporate a high frequency transmitter, a receiver, an antenna common to both transmitter and receiver, and duplexing means for providing isolation between the receiver and the transmitter. The operating range of a radar system is, in part, a function of the amplitude of energy radiated from the antenna. In conventional radar systems, the necessary energy level is obtained at the high frequency generator or, in some cases, by amplification immediately following the generator. Such systems suffer from the fact that, at relatively high energy levels, the energy level of the duplexer becomes so high as to cause injury to, or breakdown of, the duplexer; furthermore, the design requirements for a duplexer used in such systems become more rigorous and more bulky duplexing equipment is essential. A further difficulty in such prior systems is that it is often comparatively difficult to obtain the proper impedance match between the duplexer and the antenna necessary to avoid a high antenna voltage standing wave ratio. This complicates design of that portion of the radar system including the duplexer, the antenna, and the transmission line interconnecting the two.

In accordance with this invention, a high frequency amplifier tube having unique characteristics is inserted between the duplexer and the antenna. This amplifier tube is a broad band, high-power tube which is inserted between the duplexer and the antenna. This amplifier tube constitutes a reciprocal network, that is, it is capable of passing energy in either direction. In one direction, energy may pass with little or no attenuation or amplification. In the other direction, however, the tube behaves strictly as an amplifier and a substantial gain is provided by the tube. Because of these unique characteristics, energy from the transmitter may be of sufficiently low energy level at the duplexer to avoid damage thereto, and the energy from the transmitter may be amplified considerably before being radiated from the antenna. Since the tube is a reciprocal device, low-level energy received by the antenna can pass through the tube in the reverse direction without appreciable attenuation enroute to the receiver. This amplifier tube is substantially matched at both ends to the characteristic impedance of the transmission lines at both ends of the tube, thus minimizing reflections in the radar system.

Further objects and features of this invention will be understood more fully from the following detailed description of the invention with reference to the accompanying drawing wherein.

Figure 1:
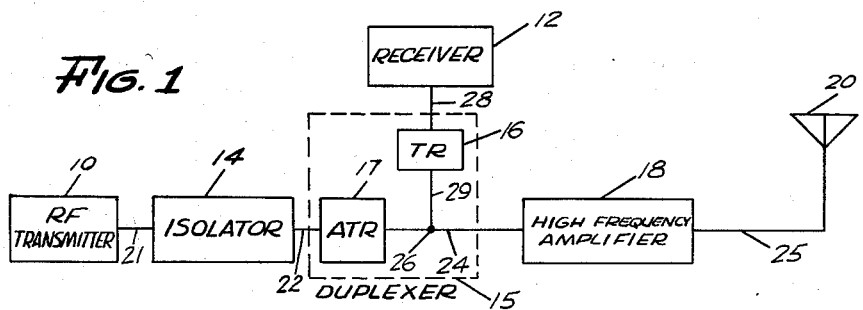
Fig. 1 is a block diagram of a radar system according to the invention.

Referring now to Fig. 1 of the drawing, a radar system is shown which includes a transmitter 10, a receiver 12, an isolator 14, a duplexer 15 including a transmit-receive switch or TR switch 16 and an antitransmit-receive switch or ATR switch 17, and a high frequency amplifier 18 inserted between the duplexer 15 and an antenna 20 common to both transmitter and receiver. The transmitter 10 may be a magnetron or any other type of generator of high frequency energy. The transmitter 10 is connected to antenna 20 by means of a high frequency transmission path, which, in addition to the isolator 14, ATR switch 17 and amplifier 18, includes transmission line sections 21, 22, 24, and 25; these sections, for example, may be either coaxial lines or waveguides.

The receiver 12 is connected to the high frequency transmission path, specifically to transmission line section 25, at junction 26, by receiver line sections 28 and 29 through the TR switch 16. The antitransmit-receive switch 17 is connected in series with the transmission path, being connected by line sections 22 and 24 to isolater 14 and amplifier 18, respectively.

The isolator 14 may be any type of nonreciprocal network, such as a ferrite isolator, which propagates energy emanating from the transmitter 10, but which substantially prevents transfer of energy received by antenna 20 and traveling in the direction of transmitter 10.

The function of duplexer 15 is well known in the art and may take a variety of forms, many of which are described in "Microwave Duplexers" by Smullin and Montgomery, which is volume 14 of the Massachusetts Institute of Technology Radiation Laboratory Series, first edition, published by McGraw-Hill Book Company, Incorporated, in 1948. Basic parallel and series systems employing TR and ATR systems also are described on pages 11–3 and 11–4 of "Principles of Radar" by Members of the Staff of the Radar School of Massachusetts Institute of Technology, second edition, published in 1946 by McGraw-Hill Book Company, Incorporated. As shown in Fig. 1, the series-connected ATR switch 17 is spaced from junction 26 by a distance equal to any number of half wave lengths at the mean operating frequency. The ATR switch 17 also may be connected in parallel with the transmission path (transmitter-antenna line) in which case the shunt-connected ATR switch would be positioned at a distance any odd number of quarter wavelengths from junction 26. Likewise, although TR switch 16, shown in Fig. 1, is connected in series with the receiver line section 28, 29, it should be understood that the shunt TR switch could be substituted therefor. Various combinations of shunt and series TR switches and ATR switches are set forth on pages 279 and 280 of the aforesaid text "Microwave Duplexers."

In order to amplify the energy derived from transmitter 10, a reentrant high-frequency amplifier 18 is inserted on the output side of the duplexer 15. A typical amplifier, shown in Fig. 2, will now be described. The amplifier 18 makes use of the interaction between an electron beam projected along a slow-wave propagating structure and the electromagnetic fields of a wave guided along said structure. The wave fields of the slow-wave structure can be resolved into a number of so-called space harmonic waves which travel with different phase velocities and the electron beam can be made to interact with one of the harmonic waves by varying the electron velocities so that it is in substantial synchronism with the phase velocity of one of these space harmonic wave components.

The amplifier 18 includes a centrally positioned cathode assembly 30, a slow-wave propagating structure 40, radio-frequency input terminal means 50, radio-frequency output terminal means 60 and magnetic field-producing means 70.

The cathode assembly 30 includes a cathode cylinder 32 whose periphery is coated with an electron-emissive material 33. A cathode connector assembly 34 is provided at each end of the cathode assembly and includes an enlarged portion 34' which serves as an end shield, such as commonly employed in magnetrons. The cathode assembly 30 is supported, and heating and biasing current is supplied to the cathode by means of lead-in conductors 35 connected to leads 36 which pass through the associated connector assembly 34. Cathode lead-in conductors 35 extend through tubular pipes 37 and through vitreous seals 38 which hermetically seal the outer ends of the pipes. The inner ends of the pipes 37 are hermetically sealed to the cylindrical portion 41 of the tube envelope, as by brazing.

Figure 2:
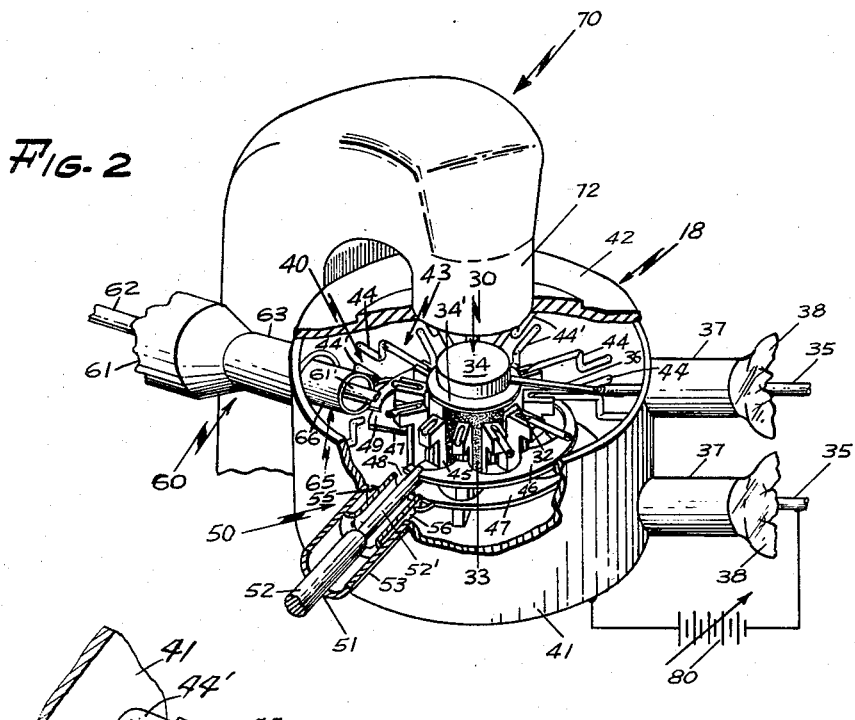
Fig. 2 is a pictorial view of the high-frequency amplifier shown in Fig. 1.
Figure 3:
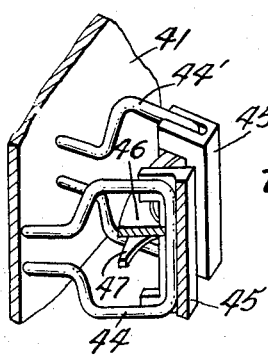
Fig. 3 is an expanded pictorial view of a portion of Fig. 2.

A slow-wave propagating structure 40 includes the cylindrical portion 41 of the tube envelope, said envelope further including end covers 42, only one of which is visible in Fig. 2. The slow-wave propagating structure 40 also includes several network elements 43 made up of electrically-conductive loops 44 and 44' and electrically-conductive segments 45. As shown in Fig. 3, the loops 44 have both ends attached to the inner wall of cylinder 41, while the midpoint of each loop 44 is attached to one end of a corresponding electrically-conductive segment 45. Each of the electrically-conductive loops 44' is also attached at both ends to the inner wall of cylinder 41 and the midpoint thereof is attached to the opposite end of a corresponding segment 45. Each segment is provided with a groove to facilitate attachment of loops 44 and 44'. The alternate network elements 43 are interconnected electrically by a conductive strap or ring 46. Intervening network elements are connected together by an electrically-conductive strap 47. The straps are not continuous but have the ends thereof spaced apart so as to provide input and output terminations 48 and 49 for the slow-wave structure 40. The two straps may be regarded generally as a parallel transmission line with the various network elements representing impedances connected between the two sides of the lines. The propagating structure 40 is a circular, but nonreentrant structure.

An input signal, for example, the relatively low level signal from the transmitter, is supplied to the amplifier 18 by means of input coupling means 50 which includes a coaxial line 51 having an inner conductor 52 and an outer conductor 53 attached to the cylindrical portion 41 of the wave propagating structure 40. Since the input coupling means 50 of Fig. 2 includes a coaxial line, that is, an unbalanced network, it is necessary to insert a well-known balun 55 between the balanced parallel wire line, comprising straps 46 and 47, and the coaxial line 51. The extension 52' of inner conductor 52, that is, the inner portion of balun 55 is connected electrically to strap 46 and the other strap 47 is connected electrically to the outer portion 56 of balun 55.

A unidirectional source of energy, such as a battery 80, is connected between the cathode 30 and slow-wave structure 40 and provides the necessary electric field therebetween. A magnetic field whose direction is parallel to the cathode axis is provided by means of the U-shaped permanent magnet 70 a portion only of which is shown in Fig. 2. The pole pieces 72 of magnet 70 are adapted to rest against the raised central portion of covers 42. The direction of the magnetic field affects the directional properties of the amplifier tube; that is, if the direction of the magnetic field is reversed, the directional properties of the amplifier are reversed.

The amplifier tube, according to the invention, combines high power output and efficiency from interaction between an electron beam and a radio-frequency signal traveling along the slow-wave propagating structure of the tube. The radio-frequency signal injected into the tube traverses the slow-wave propagating structure. A unidirectional potential is maintained between the cathode and said structure. As the potential is raised, a cloud of electrons forms around the cathode more or less in the shape of a concentric ring and rotates at an angular velocity dependent upon the applied potential. As the potential is increased, a critical value is reached to which the angular velocity of the outermost electrons becomes synchronous with the velocity of the radio-frequency wave traveling along the slow-wave structure. The electron cloud then takes the form of a hub with spokes of space charge or electrons projecting therefrom. The electrons in the spokes deliver energy to the radio-frequency circuit (slow-wave structure) and give up their potential energy to the radio-frequency field as they move radially toward the slow-wave structure. Interaction between the electron spokes and energy traveling along the slow-wave structure can exist over a wide band of frequencies without adjustment of the tube. As the unidirectional voltage is increased, the electrons in the spokes move more rapidly toward the anode and create more current flow; however, the angular velocity of the electrons remains unaltered.

The amplified signal is coupled out of the amplifier tube 18 by output coupling means 60, whose construction is similar to that of the input coupling means 50. Output coupling means 60 includes a coaxial line 61 having an inner conductor 62 and an outer conductor 63. The balun 65 includes an extension 61' of inner conductor 62 of coaxial line 61 and an outer portion 66. The inner portion 61' of balun 65 is connected to strap 46 adjacent the end thereof opposite the end to which the input coupling means 50 is connected while the outer portion 66 of balun 65 is connected to strap 47.

The amplifier 18 is substantially matched at both ends to the characteristic impedance of the transmission lines 24 and 25; this match may be achieved by means internal of the tube, as by proper adjustment of the configuration of the input coupling means 50 and output coupling means 60, or by means external to the tube such as an impedance transformer located between the coupling means 50 or 60 of tube 18 and line sections 24 and 25, respectively.

The term "reciprocal" as applied to the amplifier device refers to a device which is capable of passing energy in either direction without substantial attenuation. It should be noted that, although the amplifier device functions to amplify substantially only energy passing through the device in one direction, energy also may be transferred through the device in the opposite direction with little or no amplification or attenuation. This construction of the expression "reciprocal" should be borne in mind in construing the specification and claims.

This completes the description of the embodiment of the invention illustrated herein. However, many modifications and advantages thereof will be apparent to persons skilled in the art without departing from the spirit and scope of this invention. For example, more than one high frequency amplifier may be disposed in cascade, if greater amplification is required than can be provided with a single amplifier tube 18. It can be shown, however, that should there be any antenna mismatch, the ratio of effective duplexer energy to amplifier output energy falls off faster with increasing antenna voltage standing wave ratio as the amplitron gain is increased. Accordingly, it is desired that this invention not be limited to the particular details of the embodiment disclosed herein except as defined by the appended claims.

What is claimed is:

1. In combination, means for generating electromagnetic wave energy, means for receiving electromagnetic wave energy, an antenna common to said means for generating and to said means for receiving, duplexing means having a first portion inserted between said antenna and said means for receiving and a second portion inserted between said means for generating and said antenna, and a reciprocal electron discharge device for amplifying only energy supplied thereto from said means for generating, said electron discharge device being connected between said duplexing means and said antenna.

2. In combination, an antenna, means for generating electromagnetic wave energy, a transmission channel between said means for generating and said antenna, a receiver of electromagnetic wave energy, a receiving channel between said receiver and said antenna, duplexing means having a first portion inserted in said transmission channel and a second portion inserted in said receiver channel, a portion of said transmitting and receiving channels being common, and a reciprocal electron discharge device for amplifying only energy supplied thereto from said means for generating, said electron discharge device being connected in said common portion of said channels between said duplexing means and said antenna.

3. In combination, a transmitter, a receiver, an antenna common to said transmitter and said receiver, duplexing means in circuit with said transmitter and said receiver for isolating said transmitter and receiver from one another, and a reciprocal electron discharge device connected between said duplexing means and said antenna, said electron discharge device having a first energy coupling means coupled to said duplexing means and a second energy coupling means coupled to said antenna, said electron discharge device being constructed to amplify appreciably only energy supplied to said first energy coupling means from said transmitter.

4. In combination, a transmitter, a receiver, an antenna common to said transmitter and said receiver, duplexing means in circuit with said transmitter and said receiver for isolating said transmitter and receiver from one another, and a reciprocal electron discharge device having a first set of terminals coupled to said duplexing means and a second set of terminals coupled to said antenna, said electron discharge device being constructed to amplify appreciably only energy supplied to said first set of terminals from said transmitter.

5. In combination, a transmitter, an antenna, transmission means interconnecting said transmitter and said antenna, a receiver, a transmit-receive switch connected between said receiver and a point on said transmission means, an antitransmit-receive switch inserted in said transmission means between said transmitter and said point on said transmission means, and a reciprocal electron discharge device inserted in said transmission means between said point and said antenna, said device including a nonreentrant slow wave transmission structure for propagating high frequency electromagnetic wave energy and having first and second terminal means coupled to spaced portions of said structure, said terminal means being impedance matched to said transmission means over a predetermined frequency range of operation of said device.

6. In combination, a transmitter, an antenna, transmission means interconnecting said transmitter and said antenna, a receiver, a transmit-receive switch connected between said receiver and a point on said transmission means, an antitransmit-receive switch inserted in said transmission means between said transmitter and said point on said transmission means, and a reciprocal electron discharge device inserted in said transmission means between said point and said antenna, said device including a nonreentrant slow wave transmission structure for propagating high frequency electromagnetic wave energy, said structure having first and second terminal means coupled to spaced portions thereof, said electron discharge device being constructed to amplify appreciably only wave energy supplied to said first terminal means from said transmitter, said terminal means each being impedance matched to said transmission means over a predetermined frequency range of operation of said device.

7. In combination, a transmitter, an antenna, transmission means interconnecting said transmitter and said antenna, a receiver, a transmit-receive switch connected between said receiver and a point on said transmission means, an antitransmit-receive switch inserted in said transmission means between said transmitter and said point on said transmission means, and a reciprocal electron discharge device inserted in said transmission means between said point and said antenna, said device including a nonreentrant slow wave transmission structure having first and second terminal means coupled to spaced portions thereof, said structure providing means for propagating wave energy supplied to either of said terminal means, one of said terminal means being coupled to said antenna, said device including means for amplifying only wave energy supplied to said one terminal means.

8. In combination, a transmitter, a receiver, an antenna common to said transmitter and said receiver, duplexing means in circuit with said transmitter and said receiver for isolatng said transmitter and said receiver from one another, an amplifying electron discharge device including a reciprocal nonreentrant slow wave transmission structure for propagating electromagnetic wave energy and having first and second radio frequency terminal means coupled to spaced portions of said structure, said device being inserted between said duplexing means and said antenna, a source of electrons spaced along a region adjacent said structure, means for directing a beam of electrons through perpendicularly arranged electric and magnetic fields past a given point along said structure more than once in the same direction and in substantial energy exchanging relationship with wave energy propagating along said structure in one direction only, said device being constructed to transmit energy applied to both of said terminal means and to amplify appreciably energy supplied to one only of said terminal means.

References Cited in the file of this patent

UNITED STATES PATENTS

| | | |
|---|---|---|
| 2,681,427 | Brown et al. | June 15, 1954 |
| 2,775,721 | Dench | Dec. 25, 1956 |